United States Patent
Wang et al.

(10) Patent No.: US 8,077,666 B2
(45) Date of Patent: Dec. 13, 2011

(54) METHOD AND APPARATUS FOR ASSIGNING CHANNELS FOR A MULTI-RADIO WIRELESS MESH NETWORK

(75) Inventors: Jinling Wang, Beijing (CN); Yong Xia, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 209 days.

(21) Appl. No.: 12/163,544

(22) Filed: Jun. 27, 2008

(65) Prior Publication Data

US 2009/0010164 A1    Jan. 8, 2009

(30) Foreign Application Priority Data

Jun. 28, 2007   (CN) .......................... 2007 1 0127510

(51) Int. Cl.
*H04W 4/00* (2009.01)
*H04L 12/28* (2006.01)

(52) U.S. Cl. ...................... 370/329; 370/341; 370/431

(58) Field of Classification Search .......... 370/229–235, 370/252, 254, 328, 329, 341, 310, 338, 348, 370/392, 395.53, 467, 468, 442
See application file for complete search history.

(56) References Cited

U.S. PATENT DOCUMENTS

| 6,009,472 | A  | * | 12/1999 | Boudou et al. | 709/232 |
| 6,690,646 | B1 | * | 2/2004  | Fichou et al. | 370/231 |
| 7,277,456 | B2 | * | 10/2007 | Henry et al.  | 370/468 |
| 2005/0208949 | A1 | * | 9/2005 | Chiueh | 455/452.2 |

FOREIGN PATENT DOCUMENTS

WO    WO 2007053141 A1 *  5/2007

\* cited by examiner

*Primary Examiner* — Kevin C Harper
*Assistant Examiner* — Samina Choudhry
(74) *Attorney, Agent, or Firm* — Sughrue Mion, PLLC

(57) ABSTRACT

A method and device for assigning channels for a multi-radio mesh network is disclosed. The network comprises multiple mesh routers. Each mesh router has multiple radios, wherein, between two mesh routers that are within each other's radios transmission ranges, there is a pair of unidirectional links attached to them whose directions are oppositional each other. The method includes following steps: measuring link load of each link by measuring average busy time for the link to transmit data; and assigning a channel to each link based on the link load of the link.

19 Claims, 9 Drawing Sheets

METHOD AND APPARATUS FOR ASSIGNING CHANNELS FOR A MULTI-RADIO WIRELESS MESH NETWORK

TECHNICAL FIELD

This invention relates to wireless networking and, particularly, provides methods for channel assignment of wireless nodes to improve the capacity of multi-radio wireless mesh networks.

BACKGROUND

Wireless mesh networking is emerging as a promising technology to provide broadband Internet access. Generally speaking, a wireless mesh network is composed of a collection of mesh routers each serving as the access point for the mobile clients in its coverage range, while the mesh routers are interconnected with each other by wireless links forming a wireless ad hoc backbone. Some mesh routers have wired connections to the Internet and serve as the gateway between the mesh network and the Internet. Compared to traditional wireless LANs, the main feature of wireless mesh networks is their multi-hop wireless backbone infrastructure.

One of the key advantages of wireless mesh networks is that they provide an inexpensive, quick and easy solution to extend the existing wired networks to a wider area. Wireless mesh networks are usually built on the IEEE 802.11 technologies, but they can also be built upon other technologies such as IEEE 802.16 or Bluetooth. Well-known wireless mesh networks include MIT Roofnet, Seattle Wireless, and city-wide infrastructure mesh networks to be deployed in Philadelphia, San Francisco, and many other places to offer the Internet access to their residents, using commercial products from companies like Tropos, Cisco, and so on.

Wireless mesh networks, however, all face one significant challenge: they do not scale; the end-to-end throughput decreases dramatically with the increase of the number of mesh nodes primarily due to physical signal interference. To alleviate this problem, one simple approach is to equip each mesh router (abbreviated as node hereafter) with multiple radios (i.e., wireless interface cards) working on non-interfering channels. For example, there are twelve non-interfering channels in 802.11a and three in 802.11b/g according to the IEEE 802.11 specifications. Such networks are usually called multi-channel multi-radio mesh networks (abbreviated as MCMR mesh networks hereafter), while networks with one radio per node are called single-radio networks. In a single-radio network, all nodes have to tune their radios to one channel to keep the network connected. As a result, much of the available radio resources are wasted. In contrast, the radios in an MCMR mesh network can work on multiple channels simultaneously without interfering with each other, resulting in more efficient use of the radio resources. Consequently, the mesh network capacity can be improved if the non-interfering channels are appropriately assigned to the radios.

One of the key issues in the MCMR mesh networks is the channel assignment. The purpose of a channel assignment algorithm is to make efficient use of available radio spectrum resource with relatively few radios on each node (say 2-3 radios on each node and 12 non-interfering channels in 802.11a).

Existing channel assignment solutions for MCMR mesh networks can be classified into two categories: static channel assignment and dynamic channel assignment. Static channel assignment means that the channel setting of each radio lasts for a relatively long period of time from several minutes to even hours or days, while dynamic channel assignment means that the channel setting of each radio changes very frequently such as every several milliseconds.

Existing dynamic channel assignment solutions can be further classified into two categories: per-packet based and time-slot based. Per-packet based solutions mean that channel setting of a radio may change for each packet transmission, while the time-slot based solutions mean that channel setting of a radio will change on a fixed time slot such as every 10 ms.

Existing static channel assignment solutions can be further classified into three categories: identical-setting, topology-based and Joint decision of Channel Assignment and Routing (JCAR).

The identical-setting solution means that the channel setting of the radios on each node is the same, such as channel 1 for radio 1, channel 2 for radio 2, etc. Such solution is very simple and does not need any knowledge about the network topology and traffic patterns.

The topology-based solutions assume the topology is stable, which is the case of wireless mesh networks, and then define some metrics to measure the interference in the view of topology and try to minimize the given metrics. Representative metrics include the maximum number and average number of interfering links working on the same channel.

The JCAR solutions assume both the topology and end-to-end traffic pattern is stable, and then jointly determine the channel setting on each node and the routing between each pair of nodes. As the capacity of each link is affected by the channel assignment and the traffic of each link is determined by the end-to-end traffic demand and routing decisions, the JCAR solutions try to combine the channel assignment decision and routing decision so that the capacity and traffic of each link can be well matched.

The per-packet based dynamic channel assignment solutions require that the radio devices' channel switching time be much lower than its typical packet transmission time to justify their benefit. Otherwise the channel switching overhead will be prohibitively high. However, the channel switching time of existing commodity 802.11 network cards with existing Linux drivers is about 5 ms~19 ms, while the transmission time for a 1000-byte packet via 802.11a is just 220 µs. In the future, the channel switching time is expected to be decreased to 150-200 µs, which is still too long for per-packet based channel switching.

For time-slot based dynamic channel assignment solutions, a packet may experience long delay on each routing node before it can be transmitted. If each node has six neighboring nodes (which is the case of cellular deployment) and the packet arrival satisfies the Poisson distribution, then the queuing delay of each packet on each routing node will be six times of the original queuing delay according to the queuing theory. The intuitive reason is that a single transmission queue is broken into a number of sub-queues which are served in the same time interval. As a result, the end-to-end delay of a multi-hop path may well exceed the requirement of real-time interactive applications such as VoIP. Furthermore, Such solution requires that the clocks of a lot of nodes (not just neighboring nodes) be strictly synchronized for channel switching actions, which will also cause considerable overhead. For example, suppose node B uses a same radio to communicate with node A and C on different time slots, and node C uses a same radio to communicate with node B and D, as shown in FIG. 1. Then the clocks on node A, B, C, and D should all be synchronized, although node A and D are not neighbors of each other.

In identical-setting static channel assignment solutions, the channel setting on each node is identical, so the system can just make use of x channels with x radios on each node. As the number of radios on each node is typically much smaller than the number of available channels (say 2-3 radios on each node and 12 available channels in 802.11a), this solution cannot make efficient use of the available radio spectrum resources.

The topology-based static channel assignment solutions determine the channel setting based on the number of interfering links, but it is traffic load rather than topology that causes interference. If there is no traffic going through a link, the link will not induce any interference to other links. As a result, this type of solutions works well when the load on each link is almost equal, but performs poor when the link load is highly unbalanced. As the traffic of wireless mesh networks is usually highly unbalanced (the links near the gateway may undergo much more traffics than other links), such solutions are not well applicable in wireless mesh networks.

The JCAR static channel assignment solutions assume both the topology and end-to-end traffic pattern are stable, while in some cases the end-to-end traffic may not be stable even in the long term. Previous measurement work shows that the traffics on both local area networks and wide area networks are highly self-similar, which means that the traffic sequence measured at a small time scale (such as every second) shows a similar burst pattern to the traffic sequence measured at a large time scale (such as every hour). As a result, the sequences of traffic cannot be considered stable even on a large time scale. Furthermore, the JCAR solutions result in the static routing configuration in the network so it cannot dynamically react to the failures of nodes and links, while such failures in wireless networks inherently happen more frequently than in wired networks. Although we can revise existing routing protocols so that it can use the static routing as the default configuration and search for new paths in the case of node/link failures, the revision done on one routing protocol cannot be applicable to other routing protocols.

SUMMARY

This invention presents a novel method for channel assignment in multi-radio wireless mesh networks, which not only achieve high network capacity, but also is well applicable to wireless mesh networks.

One aspect of the present invention discloses a method for assigning channels for a multi-radio wireless mesh network. The network comprising a plurality of mesh routers, each mesh router having a plurality of radio components, wherein, between two mesh routers which are both within the transmission ranges of their radio components, there is a pair of unidirectional links attached to them, directions of the pair of links are opposite to each other. The method including following steps: measuring average busy time of each link to transmit data in the network so as to get link load of the link; and assigning a channel to each link based on the link load of each of the links.

Another aspect of the present invention discloses a device for assigning channels for a multi-radio wireless mesh network. The network comprising a plurality of mesh routers, each mesh router having a plurality of radio components, wherein, between two mesh routers that are both within transmission ranges of their frequency components, there is a pair of unidirectional links attached to them, directions of the pair of links are opposite to each other. The device comprising: a link load measuring means for measuring average busy time of each link to transmit data so as to get link load of the link; and a channel assigning means for assigning a channel to each link based on the link load of the links.

The present invention can achieve many positive effects. The invention belongs to the static channel assignment solutions, which is readily applicable to the current off-the-shelf 802.11 devices and incurs no extra delay on the packet transmission. In comparison with existing identical-setting static channel assignment solutions, our solution can make use of much more available channels with relatively few radios on each node, and therefore achieve much higher network capacity. In comparison with existing topology-based static channel assignment solutions, our solution can achieve higher capacity in the wireless mesh networks as it considers the unbalanced traffic load in the network and manage to let the links with heavy load face less interference. In comparison with existing JCAR static channel assignment solutions, our solution does not assume stable end-to-end traffic pattern so it is better applicable in real world systems.

DETAILED DESCRIPTION OF PREFERRED EMBODIMENTS

In order to overcome the shortcomings of the technical solutions cited in the Background part, the present invention gives a method for assigning channels for a multi-radio wireless mesh network. This method assigns channels of links in the network repeatedly at intervals such as several hours or days while taking the history of traffic load into consideration. This method can not only improve capacity of the network but also be specifically adapted to wireless mesh network. In the present invention, period is time interval between two successive channel assignments. It is unnecessary to make all periods to be equal.

The channel assignment process in accordance with the present invention further includes a process for iterative improvement of the assigned channels so as to change the channel of the bottle link whose utility is the maximum to further improve the capacity of the network.

For convenience of discussion, a network system model for the multi-radio wireless mesh network is firstly established.

Considering a network of n nodes each equipped with a number of radios. Different nodes may have different number of radios. Suppose there are a total of k non-interfering channels available.

We say two nodes are neighbors of each other if both are within each other's transmission range. There is a pair of unidirectional links attached to them, directions of the pair of links are opposite to each other, between two neighboring nodes if they have at least one radio working on a common channel, each link standing for a directional communication.

Figure 1:
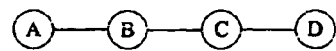
FIG. 1 shows clock synchronization in time-slot based dynamic channel assignment.
Figure 2:
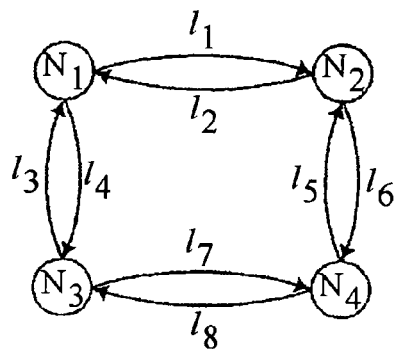
FIG. 2 shows an example of topology.

In general, a network topology is used to describe a physical network. FIG. 2 shows an example of a topology where there are 4 nodes and 8 links. In the topology showed in FIG. 2, a node represents a mesh router, and a directional edge represents a directional link. In the following, the two sets of terms are interchangeable. The reason to model the topology as a directed graph is that the achievable throughput, traffic load and interference may all be different on different directions for a pair of neighboring nodes.

The capacity of wireless networks is largely determined by the interference of wireless signals. Existing theoretical work usually model the interference of the network in two ways: protocol model and physical model. The protocol model determines interference based on the distance while the physical model considers the impact of interfering transmissions on the signal-to-noise ratio. Both models describe the interference in a deterministic way; given a set of working links, any other link either cannot work or can work without any influence. On the contrary, some measurement work on real-world systems shows that the interferences between links are sometimes not in an all-or-nothing mode but appear to be a certain degree of performance degradation.

Our solution does not bind to a specific interference model but can work with various interference models. To achieve this goal, we use a probabilistic way to describe the interference in the network. The interference degree of link $l_1$ to link $l_2$, denoted by $intf(l_1, l_2)$, is defined as the probability that $l_2$ cannot work when $l_1$ is working. In the protocol model, the interference degree has only two possible values 0 and 1. In the physical model, the interference degree can be calculated using the method to calculate the weighted conflict graph. In the measurement-based model, the interference degree can be calculated using the method proposed in (J. Padhye, S. Agarwal, V. N. Padmanabhan, L. Qiu, A. Rao, B. Zill. Estimation of Link Interference in Static Multi-hop Wireless Networks. In *Proceedings of ACM IMC* 2005).

For our solution to be applied in a variety of cases, we do not assume any interference model but assume that the value of $intf(l_i, l_j)$ for any pair of links $l_i$ and $l_j$ is given. We define $intf(l_i, l_j)=1$ to simplify the description in the following of the paper.

Figure 3:
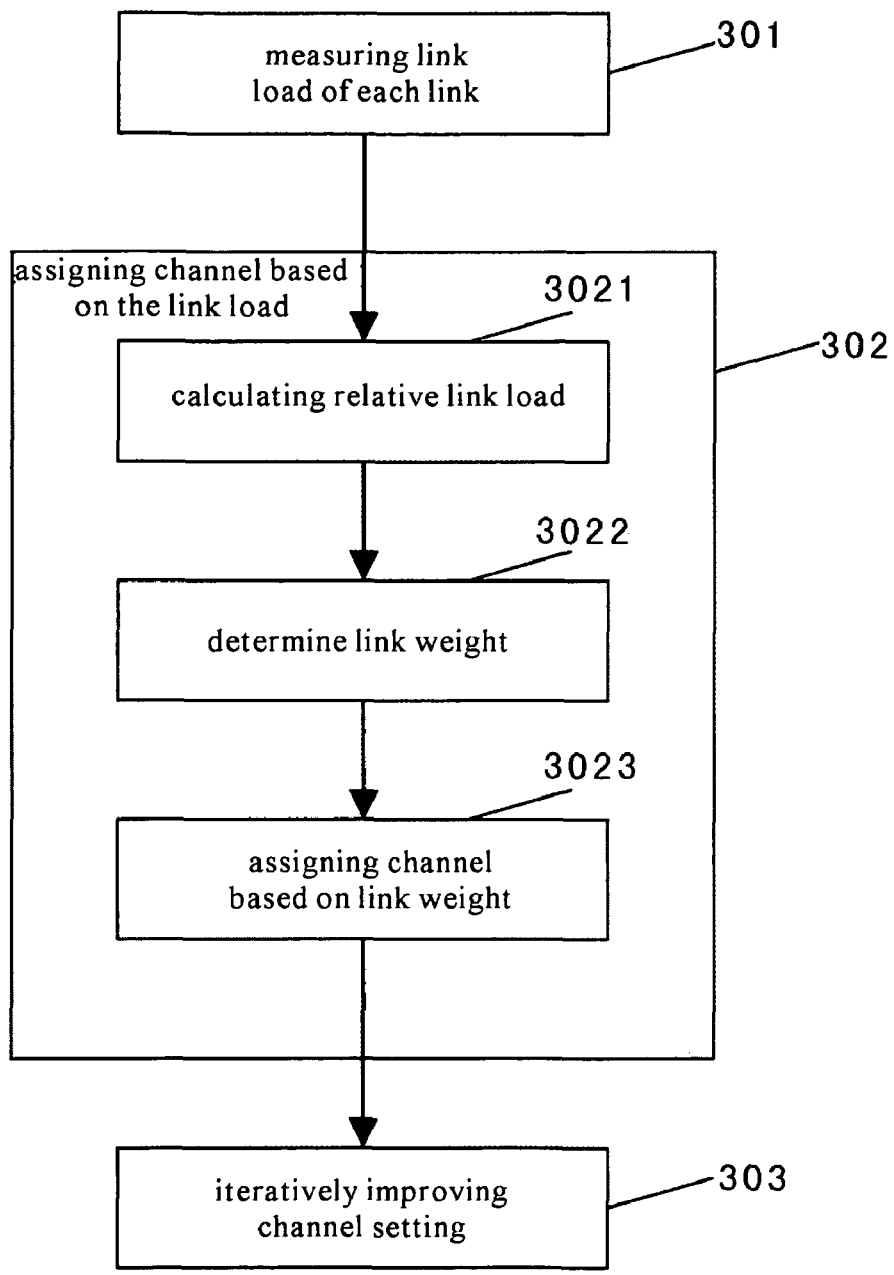
FIG. 3 shows a general flowchart of the channel assignment method in accordance with the present invention.

The method for assigning channels based on the above model in accordance with the present invention will be discussed with reference to FIG. 3. This method begins with step 301, wherein, for each period, we first measure the load of each link. In the present invention, link load of a link is obtained by measuring average busy time of each link to transmit data in the network. The average busy time of a link is a period in which the link is used to transmit data in a unit of time. The busy time is a better metric than the traffic amount to evaluate the load of a link as different links may have different bandwidths due to factors such as signal quality. We denote the load of link $l_i$ in period p by $load(l_i, p)$.

Then, at step 302, channel assignment is performed based on the loads of all links in a given period that are measured at step 301.

The step 302 includes multiple specific substeps. At substep 3021, we then calculate the relative load of each link $l_i$ in period p, which is $load(l_i, p)$ divided by the average load of all links in this period. The relative load indicates the degree of busyness of the link in comparison with other links.

Then, at substep 3022, based on the relative load of each link, we determine the weight of a link, which stands for the expected relative load of the link in the next period.

To determine the weight of each link, we record the last t periods of relative loads for each link, where t is a configurable parameter. Let $\mu(l_i)$ and $\sigma(l_i)$ denote the mean value and standard error of the last t periods of relative loads on link $l_i$. For each link $l_i$, if $\mu(l_i)-h\times\sigma(l_i)>1$ or $\mu(l_i)+h\times\sigma(l_i)<1$, where h is a configurable parameter such as 2, we consider the loads of the link have a stable pattern in comparison with average loads and then estimate the expected relative load of the link based on the historical data. In other cases, we consider the relative load of the link is unstable and cannot estimate the relative load of the next period based on the historical data. So we set the weight of the link to be 1, which means that the expected load of the link in the next period is the average load of all links in the network.

Let $weight(l_i)$ denote the weight of link $l_i$. The processes to calculate $weight(l_i)$ are as follows:

1. If $\mu(l_i)-h\times\sigma(l_i)>1$, which means that the loads of the link are greater than average loads in most cases, we set weight $(l_i)$ to be $\mu(l_i)$;
2. If $\mu(l_i)+h\times\sigma(l_i)<1$, which means that the loads of the link are smaller than average loads in most cases, we set weight $(l_i)$ to be $\mu(l_i)$;
3. If $\mu(l_i)-h\times\sigma(l_i)\leqq 1$ and $\mu(l_i)+h\times\sigma(l_i)\geqq 1$, we set $weight(l_i)$ to be 1;
4. In the first t periods after the system startup, as there are no enough historical data to determine the stability of relative link loads, we always consider the link load to be unstable and set the weight of them to be 1.

From above, the present invention attempts to determine stability of the relative load of the link by analyzing historical data. The present invention allows some of the links to have stable relative loads while others do not have stable relative loads. However, the previous JCAR requires each end-to-end traffic to be stabile.

Figure 4A:
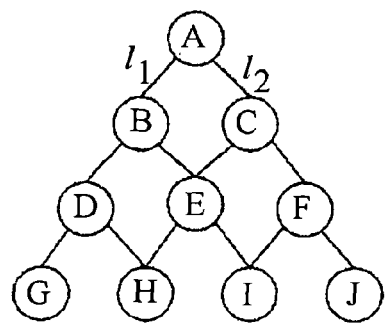
FIGS. 4A and 4B show two topologies to illustrate partial stability of relative link loads.
Figure 4B:
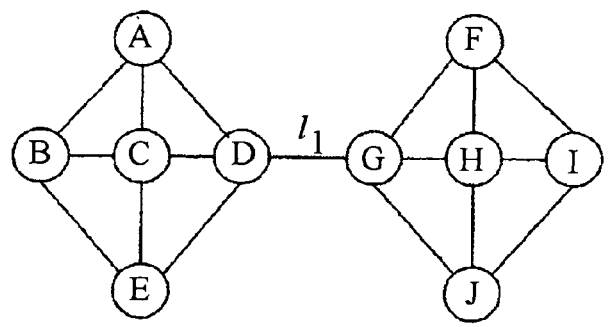

We use two topologies shown in FIGS. 4A and 4B to illustrate the differences. In FIG. 4A, node A is a gateway to the Internet. Although the end-to-end traffic between each pair of nodes may be very unstable, links $l_1$ and $l_2$ may always have heavier loads than other links if most traffic is caused by Internet access. As a result, the relative loads on link $l_1$ and $l_2$ will show a stable pattern. In FIG. 4B, the network is composed of two parts that are connected with a single link $l_1$. Usually $l_1$ will become a bottleneck and have heavier loads than average. Therefore, the relative load of $l_1$ is also stable.

After the weight of each link is determined at substep 3022, the process proceeds to substep 3023. In the substep 3023, channels are assigned based on the determined weight of each link. Then, step 302 ends.

If the assigned channel setting needs to be further optimized, the process proceeds to 303. At step 303, the channel setting assigned at step 302 is iteratively optimized. Below, substep 3023 and optional step 303 are described detailedly with reference to FIGS. 6 and 7. First, step 3023 for assigning channels based on the weight of each link is described with reference to FIG. 6.

Figure 5A:
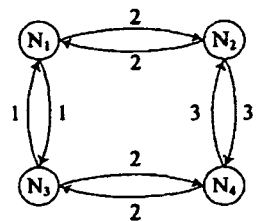
FIGS. 5B, 5C and 5D show sub-graphs resulting from decomposition of the topology showed in FIG. 5A.
Figure 5B:
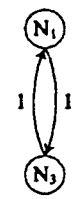
Figure 5C:
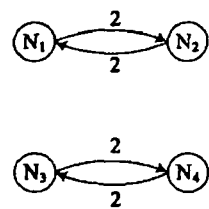
Figure 5D:
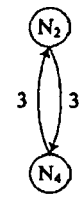

As for channel assignment, our basic idea is to consider the channel assignment problem as a graph decomposition problem. The graph decomposition in the present invention is to decompose topology of a network into several sub-graphs based on the weight of each link. For example, suppose FIG. 5A is the result of channel assignment for the topology shown in FIG. 2, where each node is equipped with 2 radios and the figure on each link represents the channel of the link. We can decompose FIG. 5A into three sub-graphs as shown in FIGS. 5B, 5C, and 5D, where the links in each sub-graph are set to a same channel.

The requirements of the graph decomposition problem are as follows:
1. Each link in the original graph should appear in just one sub-graph.
2. The original graph can be decomposed into at most k sub-graphs, where k is the number of available non-interfering channels.
3. The number of sub-graphs that a node involves is no more than the number of radios on the node.

To improve the capacity of the network, our solution decomposes the original graph of the topology with the following principles:
1. Each node distributes its links (i.e., links attached to it) to the sub-graphs based on the weights of links, so that the sum of weights of its links in each sub-graph is as equal as possible. Intuitively, as different radios of a node can work simultaneously on different channels and the weight of a link stands for the expected relative load of the link, the best approach for a node to maximize its throughput is to distribute its loads to all radios (i.e., to different sub-graphs) as fairly as possible.
2. The connected components in each sub-graph should be as small as possible, as neighboring links always interfere with each other if working on the same channel.
3. Different connected component in a sub-graph should be as distant as possible to avoid the interference between the links.

Figure 6:
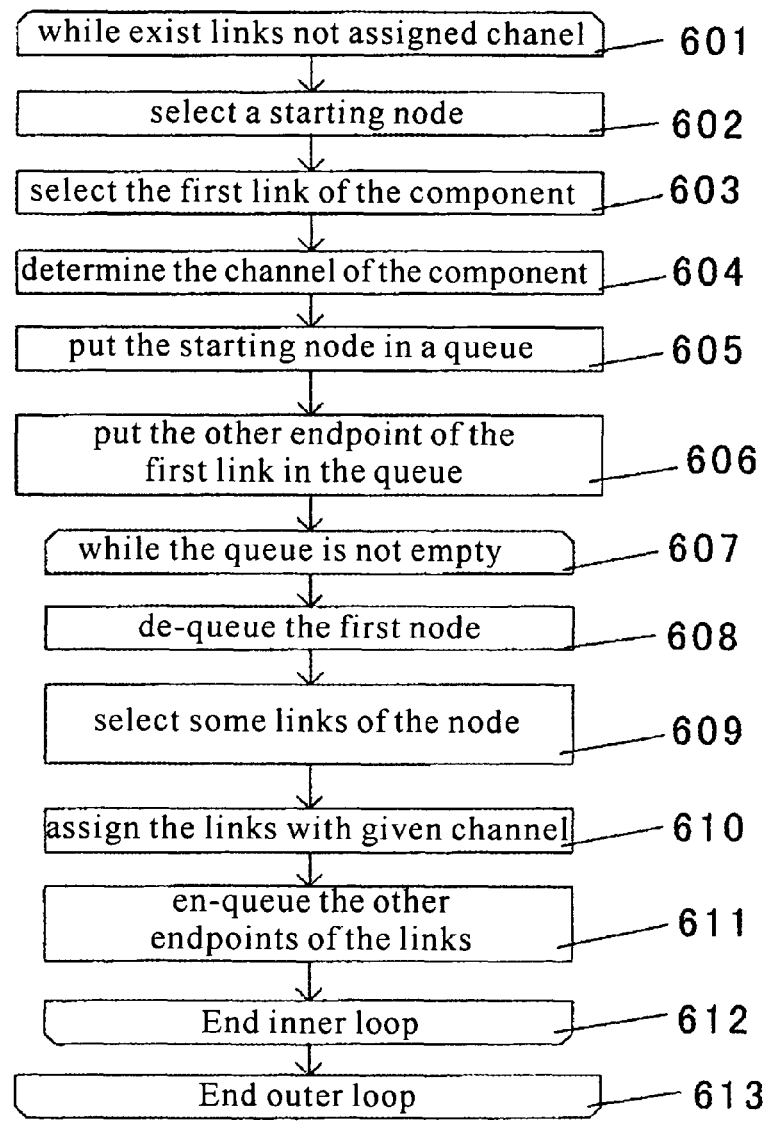
FIG. 6 is flowchart detailedly showing the process of channel assignment showed in FIG. 3.

As shown in FIG. 6, the process for assigning channels based on weight of each link consists of two loops. The outer loop including steps 601-603 creates one of connected components in a sub-graph in each traverse. The inner loop including steps 607-612 constructs the connected component by traversing topology of the network in a breadth-first traversing way. The outer loop repeats until each link is assigned a channel.

The process of FIG. 6 starts to perform the outer loop at step 601, wherein it is decided whether there is a node to which links unassigned with channels in this channel assignment are attached. If Yes, the following outer loop is performed. Otherwise, the process ends.

At step 602, on node is selected from those nodes which links unassigned with channels in this channel assignment are attached to as starting node. The order via which to assign channels to the radios should be carefully considered in the process of channel assignment. In typical cases, the number of radios on a node is less than the number of neighbors connecting to the node, so the node has to use one radio to connect multiple neighbors. As a result, when a node finishes the channel setting of its radios, the neighbors of the node may be constrained in determining their channel settings. This is the so-called channel dependence phenomenon. The earlier a node is processed, the more freedom it has in determining its channel setting so it is possible to well avoid interference. On the contrary, the nodes processed later may have to accept a channel setting solution that incurs heavy interference.

We define the weight of a node as the sum of weights of all links attached to it. The rules for our solution to select the starting node in building a connected component are as follows:

1. The node with maximum weight is selected in the first priority, as it is more likely to become the performance bottleneck of the network.
2. If there are multiple nodes with the same maximum weight, the node with least vacant radios is selected in the first place. The vacant radios of a node are the radios that have not been assigned channels yet. Intuitively, the fewer vacant radios a node owns, the less freedom it has in determining the channel setting, so it should be processed in priority for fear that it becomes the bottleneck of the system.

After determining the starting node, the next thing is to select, from links attached to the starting node that are unassigned with channels in this channel assignment, the link that has maximum link weight as first link at step 603.

Then, the process proceeds to step 604, wherein the channel to be used in the current connected component is determined. In the present invention, preferred channel for the link firstly added into a connected component (i.e., the first link) is set as the channel to be used in the connected component is.

Based on the assigned channels of links around the link, we can calculate the preferred channel for a given link, i.e., the channel with which the link can experience the least amount of interference. The preferred channel for link $l_i$ is calculated in the following way. Let LS(ch) denote the set of links in the network that have been assigned with channel ch. The total amount of interference that link $l_i$ will experience on channel ch is then $$\sum_{l_j \in LS(ch)} intf(l_j, l_i) \times weight(l_j),$$

and the channel with the least total amount of interference is the preferred channel of $l_i$. If there are multiple such channels available, we will randomly choose one as the preferred channel of $l_i$.

After the first link added into the connected component and the channel of the connected component, topology of the network is traversed from the starting node in a breadth-first traversing way to construct the connected component. First, the selected starting node is putted into a FIFO queue at step 605. Then, the other node of the first link is putted into the queue at step 606. The queue is thus initialized.

Next, at step 607, whether the queue is empty is decided. If No, the following steps of the inner loop are performed. Otherwise, the process exits the inner loop and returns the outer loop.

At step 608, first of nodes in the queue is de-queued. If the de-queued node has links that are unassigned with channels and unselected in this channel assignment, the process proceeds to step 609. Otherwise, next node in the queue is de-queued.

Then at step 609, a node selects its links and adds them into the connected component with the following rules:
1. If the node has no vacant radios, all of its links that are unassigned channels are added to the component.
2. Otherwise, the node works in the following way:
   1) Calculate the fair share of its radio for this sub-graph. The fair share of weight of the radio is calculated as follows. Let ch denote the channel that is determined at step 604 to be used in the sub-graph and LS denote the set of links of the node that are assigned channel ch or not assigned channels yet. Let weight(LS) denote sum of weights of all links in LS and v denote the number of vacant radios of the node. Then the fair share of weight of its radio for this sub-graph is weight(LS)/(1+v), which means that weight of LS is fairly distributed to the current radio and remaining vacant radios of the node.

2) Browse its links that are unassigned channels in a descending order of the link weights. For each link being browsed, the link is added to the connected component if the sum of weights of its links assigned channel ch is no more than the fair share of its radio for this sub-graph.

If no link is selected at step 609, the next node is de-queued. Otherwise, the process proceeds to step 610. At step 610, the channel determined at step 604 is assigned to the links that are selected and added into the current connected component. Then, at step 611, the other nodes of the selected links are queued.

Alternatively, a channel for a connected component could be assigned to all links in the connected component once the connected component is completely built in the current inner loop instead of assigning it to links following the links are selected at step 610.

The iterative improvement process at step 303 will be described detailedly with reference to FIG. 7. The purpose of the iterative improvement phase is to further improve the network capacity based on the result of basic channel setting phase. The basic idea is to find the bottleneck links in the network by calculating the utility of each link, and then try to update the channel of these links to other channels to further decrease interference of these links. Therefore two problems should be addressed in this phase: 1) how to find bottleneck links; 2) how to change channels of bottleneck links to other channels.

Figure 7:
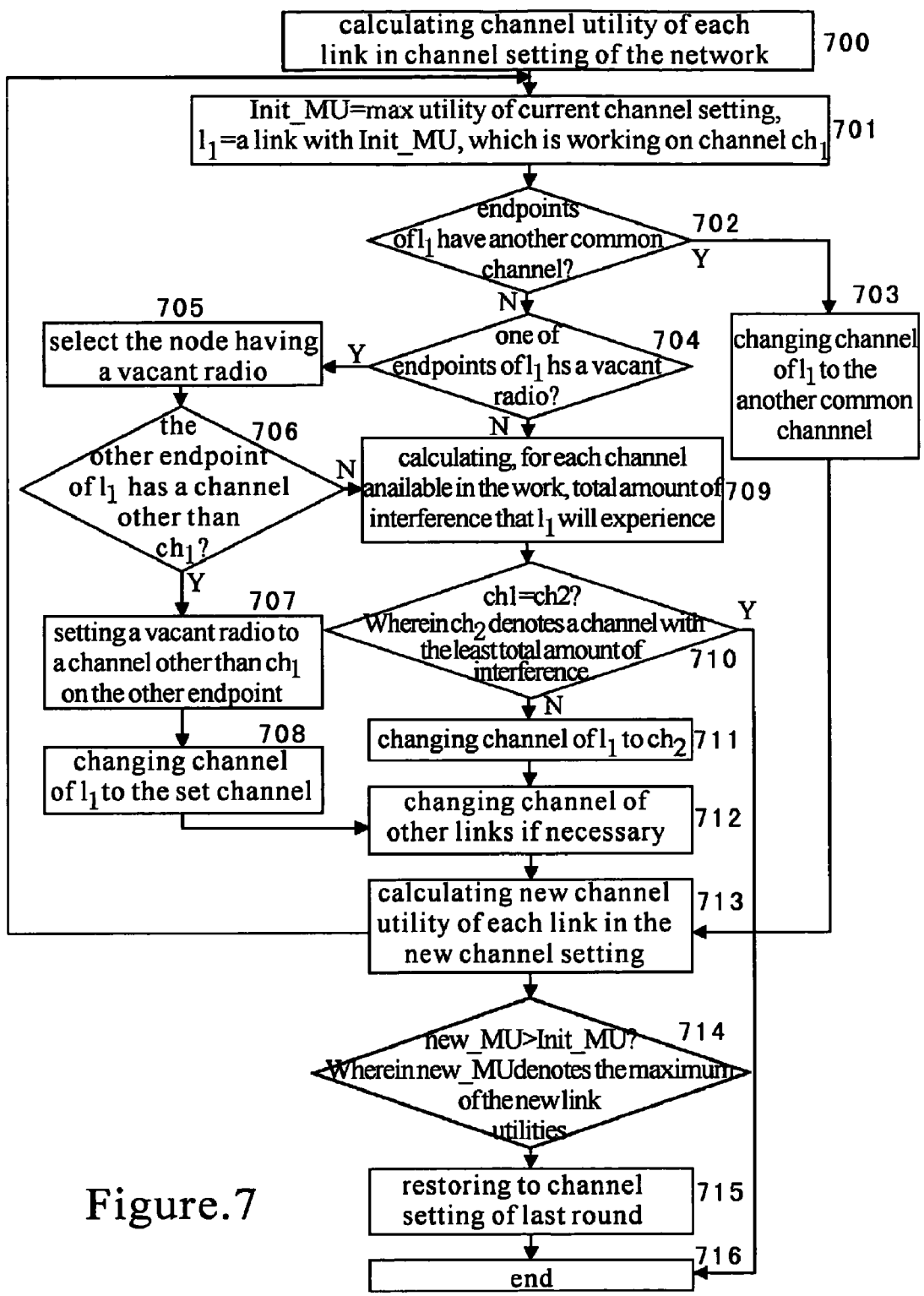
FIG. 7 is flowchart showing the iterative improvement phase showed in FIG. 3.

The process of FIG. 7 starts with step 700, wherein channel utility of each link in channel setting of the network is calculated.

To find the bottleneck links, we define the utility of link $l_i$, denoted by $util(l_i)$, as the normalized channel busy time in the view of link $l_i$, and then the bottleneck links are the links with the maximum utility. Suppose there are a total of m links in the network denoted by $l_1, l_2, \ldots, l_m$. When a link $l_j$ is working, the probability that $l_i$ cannot work (i.e., the channel is busy in the view of $l_i$) is $intf(l_j, l_i)$. So we can calculate the utility of link $l_i$ with the following expression:

$$util(l_i) = \sum_{j=1}^{m} intf(l_j, l_i) \times weight(l_j)$$

Recall that the weight of a link stands for the expected relative load of the link in the next period, so the above expression is a conservative simplification with the implication that all interfering links of $l_i$ work sequentially, while in reality some links that interfere with $l_i$ may work simultaneously without interfering with each other. In other words, it is based on the worst-case result of packet scheduling. However, this calculation is reasonable due to the fact that 802.11 DCF uses a random scheduling mechanism. As there is no synchronization between the transmissions of nodes that not in the carrier sensing range of each other, it is preferable to estimate the message scheduling in a conservative way.

Then, at step 701, based on results calculated at step 700, the link with the maximum channel utility is selected as bottleneck link $l_1$, wherein the channel on which the bottleneck link is working is denoted as $ch_1$, and the maximum channel utility is denoted as Init_MU. After finding out the bottleneck links, the next thing is to change the current channel of the bottleneck link and the current channels of other links that have channel dependence with the bottleneck link to other channels to reduce the interference. Our goal is to decrease the maximum utility of all links so that the network capacity can be improved. However, due to channel dependence, when we change the channel of a given link, the channel of some other links may have to be changed accordingly, which may lead to the result that the maximum utility of all links increases rather than decreases. To deal with this problem, we try to decrease the channel dependence between the links so that the affected links of a channel update is as few as possible.

Suppose we will change the channel of link $l_1$ from $ch_1$ to another channel. In the following cases, the channel of $l_1$ will be updated without any affect to other links:

The two endpoints of $l_1$ have other common channels besides $ch_1$. In this case, another common channel can be assigned to the link directly.

One of the endpoints of $l_1$ has vacant radios. In this case, the vacant radio can be set to a channel other than $ch_1$ on the other endpoint, and the channel of $l_1$ will be updated to this channel.

The following steps shown in FIG. 7 illustrate implementation of such case. At step 702, it is decided whether two nodes of the bottleneck link have another common channel besides channel $ch_1$. If Yes, the process proceeds to step 703. Otherwise, the process proceeds to step 704. At step 703, the channel of the bottleneck link is changed to one of the common channels. Then, the process proceeds to step 713.

At step 704, it is decided whether nodes of the bottleneck link have a vacant radio. If Yes, the process proceeds to step 705. Otherwise, the process proceeds to step 709. At step 705, one node of the bottleneck link having a vacant radio is selected. At step 706, then it is decided whether the other node of the bottleneck link has a channel other than the channel $ch_1$. If Yes, the process proceeds to step 707. If No, the process proceeds to step 709. At step 707, one vacant radio is set to a channel other than $ch_1$ on the other node. Then, at step 708, the channel of the bottleneck link is changed from $ch_1$ to the set channel. Then, the process proceeds to step 713.

In other case, change of channel of $l_1$ will affect channels of other links due to channel dependence. In such case, the preferred channel of $l_1$ is calculated and denoted as $ch_2$. If $ch_1=ch_2$, since no way can be used to reduce the channel utility of $l_1$ by changing channel, the iterative improvement phrase ends. Otherwise, channel on which radios on two nodes of the bottleneck link are working is changed from $ch_1$ to $ch_2$ so as to change the channel of the bottleneck link from channel $ch_1$ to $ch_2$. Then channel of other links that needs to be changed due to the change of channel of the radios is also changed from $ch_1$ to $ch_2$. The channel update step will end in limited steps.

The following steps shown in FIG. 7 illustrate such implementation. At step 709, for each channel available in the work, total amount of interference that the bottleneck link will face is calculated. Then at step 710, it is decided whether the channel with the least total amount of interference, which is denoted as $ch_2$, is the channel $ch_1$. If Yes, the process proceeds to step 716. If No, the process proceeds to 711. At step 711, channel on which radios on two nodes of the bottleneck link are working is changed from $ch_1$ to $ch_2$ so as to change the channel of the bottleneck link from channel $ch_1$ to $ch_2$. At step 712, channel of other links that needs to be changed due to the change of channel of the radios in step 711 is changed from $ch_1$ to $ch_2$. After channel of the bottleneck link and channels of links that have link dependence with the bottleneck link, the method shown in FIG. 7 calculates new channel utility of each link in the new channel setting at step 713. Then at step 714, it is decided whether new_MU, which denotes the maximum of the new link utilities, is larger than the Init_MU. If No, the next iteration is performed. If Yes, the process proceeds to step 715. At step 715, the channel setting is restored to the channel setting before the new channel setting. The process ends at step 716.

The example of specific method according to the present invention has been described. The device for implementing the present invention will be described. In the following description, principle of functions of some components is the same of that of the foregoing method, so detailed description thereof is omitted.

Figure 8:
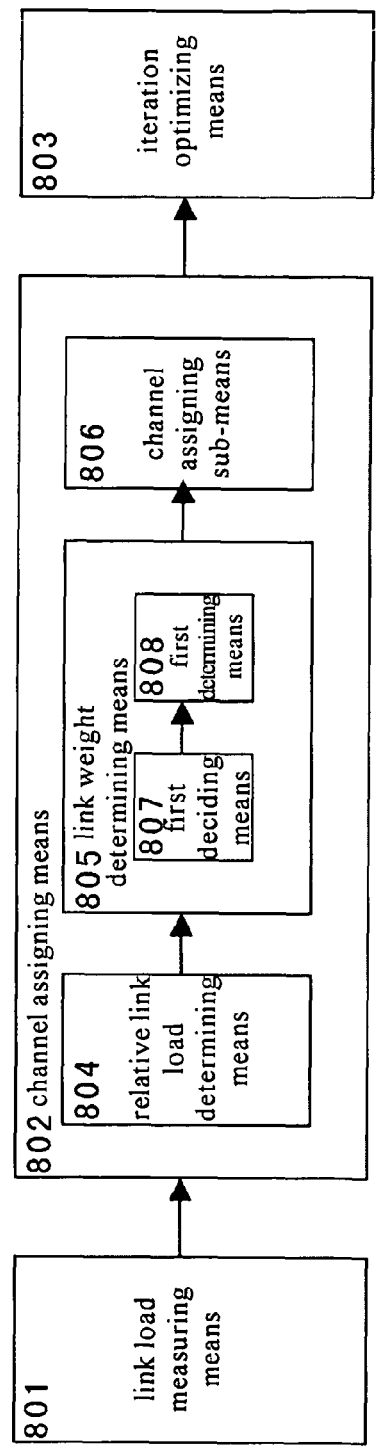
FIG. 8 is a block showing the structure of the device for assigning channels in accordance with the present invention.

As shown in FIG. 8, which shows a channel assign device 800. The channel assigning device 800 comprises at least a link load measuring means 801, a channel assigning means 802 and an optional iteration optimizing means 803.

The link load measuring means 801 measures average busy time of each link to transmit data so as to get link load of the link, and then sends that measured link load to channel assigning means 802. The channel assigning means 802 assigns a channel to each link based on the link load of the links from channel assigning means 802.

In order to improve the throughput of the network, in one embodiment of the present invention, an iteration optimizing means 803 is applied to further improve the channel setting by changing channels of bottleneck links in the network that the channel assigning means 802 has assigned to further reduce interference that those links face.

The channel assigning means 802 further comprises a relative link load determining means 804, a link weight determining means 805 and a channel assigning sub-means 806 (as shown in FIG. 8).

The relative link load determining means 804 receives information about link load of each link from link load measuring means 801, and divides the link load by average of the link loads of all links in a period so as to determine relative link load of each link for the period. The link weight determining means 805 decides, for each link, whether the link has existed in the last t periods, wherein the t is an integer that is larger than 0. The link weight determining means 805 determines link weight of the link to be 1 if the link has existed in the last t periods, and determines link weight of the link based on relative link loads of the link in the last t periods from the relative link load determining means 804 if the link has not existed in the last t periods. Then, information about weight of the link is sent to channel assigning sub-means 806. The channel assigning sub-means 806 assigns a channel to each link based on the link weight of the link.

FIG. 8 further shows the blocks comprised in the link weight determining means 805. Particularly, link weight determining means 805 comprises a first deciding means 807 and a first determining means 808.

The first deciding means 807 decides, for each link L, the relation between $\mu(L)-h\times\sigma(L)$ or $\mu(L)+h\times\sigma(L)$ and 1, wherein, $\mu(L)$ and $\sigma(L)$ denote respectively mean value and standard error of relative loads on link L in the last t periods, and h is an integer that is larger than 0 or equal to 0. The preferred value of h ranges from 0 to 3, for example, 2. The first determining means 808 determines the link weight of the link L to be 1 or $\mu(L)$ according to the deciding result of the first deciding means 807. In particular, the first determining means 808 determines the link weight of the link L to be $\mu(L)$ if the deciding result indicates $\mu(L)-h\times\sigma(L)>1$ or $\mu(L)+h\times\sigma(L)<1$, and determines the link weight of link L to be 1 if the deciding result indicates $\mu(L)-h\times\sigma(L)\leq 1$ and $\mu(L)+h\times\sigma(L)\geq 1$.

Figure 9:
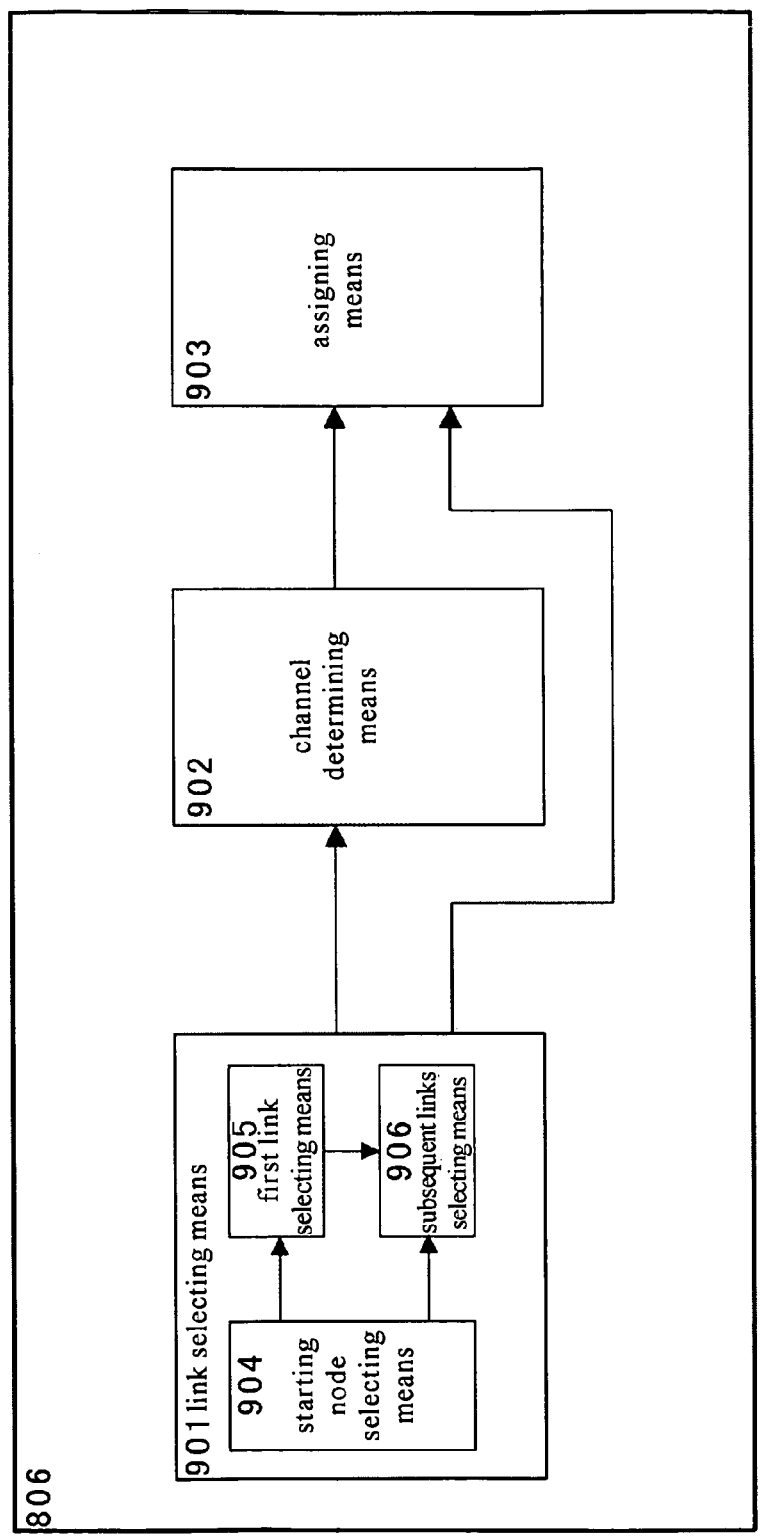
FIG. 9 is a block showing the structure of the channel assigning sub-means in the device for assigning channels in accordance with the present invention.

FIG. 9 is a block showing the structure of the channel assigning sub-means 806 in the channel assigning device. The channel assigning sub-means 806 comprises a link selecting means 901, a channel determining means 902 and a assigning means 903.

The link selecting means 901 the link weight of each link in the network that is determined by link weight determining means 805. Then, the link selecting means 901 repeats the following process until there is no links that are unassigned with channels among those that attach to the mesh routers in the network. Firstly, the link selecting means 901 selects one node from the mesh routers as starting node and the link that has maximum link weight from links attached to the starting node that are unassigned with channels as first link based on the link weights. The link selecting means 901 then sends information on the first link to the channel determining means 902, selects subsequent links by traversing topology of the network from the starting node in a breadth-first traversing way and sends information on the first link and the subsequent links to the assigning means 903.

The channel determining means 902 decides channel to be assigned currently after receiving the first link from link selecting means 901. Channel determining means 902 determines randomly one from those that is not assigned if there is a channel that is not assigned. If there is not a channel that is not assigned, channel determining means 902 calculates, for each channel available in the work, total amount of interference that the first link will face if the channel is assigned to it and determines the channel with the least total amount of interference. Then, channel determining means 902 sends the determined channel to the assigning means 903.

The assigning means 903 receives the first link and the subsequent link selected by the link selecting means 901 and the channel to be assigned currently determined by the channel determining means 902, and assigns the channel to the first link and the subsequent link.

As shown in FIG. 9, the link selecting means 901 further comprises a starting node selecting means 904, a first link selecting means 905 and a subsequent links selecting means 906. The starting node selecting means 904 selects one node from the mesh routers as the starting node based on the link weights. The first link selecting means 905 selects the link that has maximum link weight from links attached to the starting node that are unassigned with channels as the first link, and sends the information on the first link to the channel determining means. The subsequent links selecting means 906 selects the subsequent links by traversing the topology of the network from the starting node in a breadth-first traversing way, and sends the information on the subsequent links to the assigning means.

Figure 10:
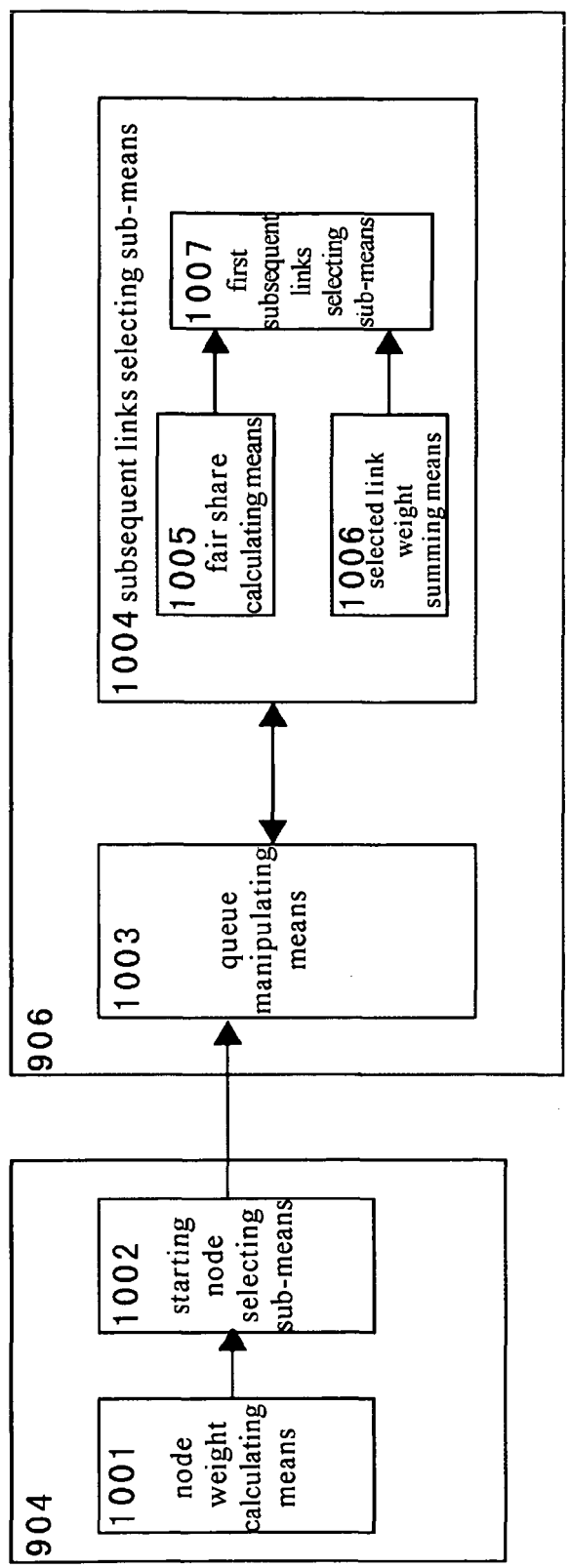
FIG. 10 is a block showing the structure of the link selecting means in the device for assigning channels in accordance with the present invention.

FIG. 10 detailedly shows some blocks comprised in the starting node selecting means 904 and subsequent links selecting means 906.

As shown in FIG. 10, starting node selecting means 904 comprises a node weight calculating means 1001 and starting node selecting sub-means 1002. The subsequent links selecting means 906 comprises a queue manipulating means 1003 and a subsequent links selecting sub-means 1004.

The node weight calculating means 1001 sums, for each node, the link weights, which are determined by the link weight determining means 805, of all links attached to the node so as to calculate node weight of the node. Then, the starting node selecting sub-means 1002, according to the node weight of each node that calculated by the node weight calculating means 1001, decides whether there are a plurality of nodes with the same maximum node weight, selects the node with least vacant radios from the plurality of nodes with the same maximum node weight as the starting node if Yes and selects the node with the maximum node weight as the starting node if No.

The queue manipulating means 1003 firstly puts the starting node and the other node of the first link into a FIFO queue in order. The queue manipulating means 1003 then de-queues the first of nodes in the queue, and sends information on the de-queued node to subsequent links selecting sub-means 1004 so as to build the current connected component by traversing the topology.

In the process, the queue manipulating means 1003 puts a node from the subsequent links selecting sub-means 1004 into the FIFO when receiving information on it. The queue manipulating means 1003 de-queues first of nodes in the queue when a de-queuing instruction is received from the subsequent links selecting sub-means 1004, and sends it to subsequent links selecting sub-means 1004 so as to resume the traverse of the topology. The queue manipulating means 1003 stops building the current connected component until there is no node in the queue.

The subsequent links selecting sub-means 1004 is used for selecting subsequent links other than the first link in the current connected component. In a first case, that is, when there is no a link that is unassigned with a channel and unselected among links attached to the node de-queued from the queue manipulating means 1003, the subsequent links selecting sub-means 1004 sends a de-queuing instruction to the queue manipulating means. This case means that there is not other edges from the node to be further traversed.

In the second case, that is, when there is a link that is unassigned with a channel and unselected among links attached to the node de-queued from the queue manipulating means 1003 and the de-queued node has a plurality of vacant radios, subsequent links selecting sub-means 1004 selects, from links attached to the de-queued node that are unassigned with channels and unselected, some links in order to fairly distribute link weights of those unassigned with channels to the plurality of vacant radios. In this case, some links might have not been selected. If a link is selected, information on the other node of the link is sent to the queue manipulating means 1003. The queue manipulating means 1003 puts these nodes into the FIFO to resume the traverse from these nodes. Then the subsequent links selecting sub-means 1004 sends a de-queuing instruction to the queue manipulating means to instruct it to select the next node to de-queue. The traverse can be resumed from the node. On the other hand, a case in which no link is selected means no edge from the de-queued node needs to be traversed. Therefore, only a de-queuing instruction is sent to the queue manipulating means 1003 to instruct it to select next node to de-queue. The traverse will be resumed from the node.

In addition, in the third case, that is, when there is a link that is unassigned with a channel and unselected among links attached to the node de-queued from the queue manipulating means but the de-queued node does not have a plurality of vacant radios, the subsequent links selecting sub-means 1004 selects all of links attached to the de-queued node that are unassigned with channels and unselected. Similarly, subsequent links selecting sub-means 1004 then sends information on other nodes of the selected links to the queue manipulating means 1003 and then sends a de-queuing instruction to the queue manipulating means 1003.

Figure 11:
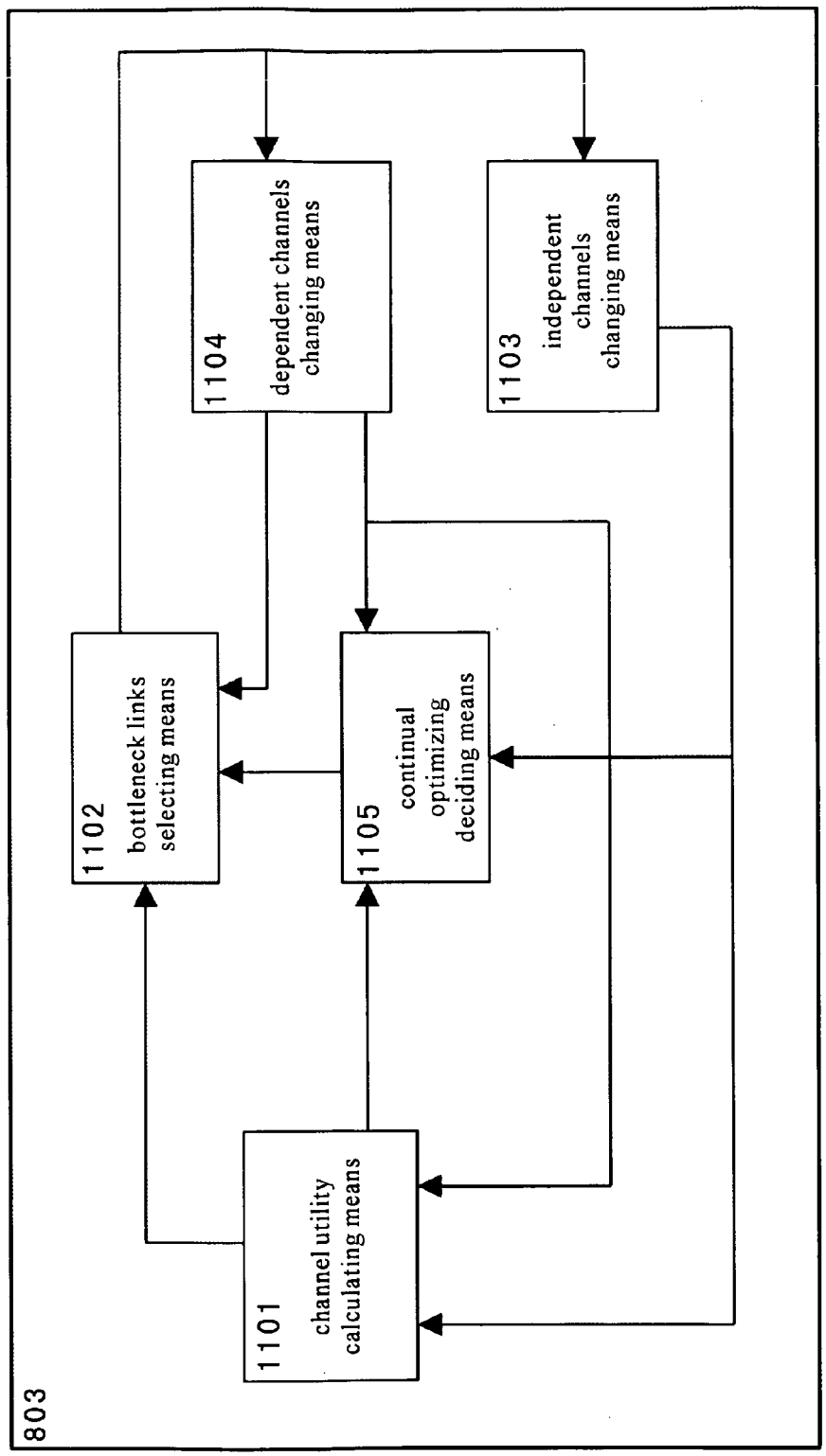
FIG. 11 is a block showing the structure of the iteration optimizing means in the device for assigning channels in accordance with the present invention.

FIG. 10 further shows some blocks for the second case comprised in subsequent links selecting sub-means 1004. As shown, the fair share calculating means 1005 calculates sum of the link weights of all of links attached to the de-queued node that are unassigned with channels, and divides the sum of the link weights by number of vacant radios of the de-queued node so as to obtain fair share of one of the vacant radios. In addition, the selected link weight summing means 1006 calculates sum of link weights of the selected links attached to the de-queued node. Then, the first subsequent links selecting sub-means 1007 decides whether the sum of link weights calculated by the selected link weight summing means 1006 is less than the fair share calculated by the fair share calculating means 1005, and, in descending order of the link weights, selects links from those attached to the de-queued node that are unassigned with channels and unselected in this channel assignment, such that sum of the link weights of those selected before and selected currently becomes maximum while not larger than the fair share if Yes, but selecting no link if No. FIG. 11 detailedly shows blocks comprised in the iteration optimizing means 803 shown in to FIG. 8. The iteration optimizing means 803 comprises a channel utility calculating means 1101, a bottleneck links selecting means 1102, an independent channels changing means 1103, a dependent channels changing means 1104 and a continual optimizing deciding means 1105.

The channel utility calculating means 1101 calculates channel utility of each link in channel setting of the network from the channel assigning means 802, the independent channels changing means 1103 or the dependent channels changing means 1104. At the beginning of the optimization, the channel utility calculating means 1101 calculates the channel utility of each link in channel setting of the network from the channel assigning means 802. Then, during the optimizing, channel utility calculating means 1101 calculates the channel utility of each link in channel setting of the network from the independent channels changing means 1103 or dependent channels changing means 1104. In either of the cases, the channel utility calculating means 1101 sends the calculated channel utility to bottleneck links selecting means 1102 and continual optimizing deciding means 1105.

The bottleneck links selecting means 1102 receives the channel utility from channel utility calculating means 1101. Then bottleneck links selecting means 1102 select selects the link with the maximum channel utility as bottleneck link until an instruction indicating not to continue to select is received from the dependent channels changing means 1104 or the continual optimizing means 1105. For convenience of description, the channel on which the bottleneck link is working is denoted as $ch_1$, and the maximum channel utility is denoted as Init_MU.

The independent channels changing means 1103 is used to change channel of the bottleneck link selected by the bottleneck links selecting means 1102 without affecting other channels.

If two nodes of the bottleneck link have another common channel besides channel $ch_1$, independent channels changing means 1103 changes the channel of the bottleneck link from the channel $ch_1$ to the another common channel. If two nodes of the bottleneck link do not have another common channel besides channel $ch_1$, but at least one node of the bottleneck link has a vacant radio and the other node of the bottleneck link has a channel other than the channel $ch_1$, the independent channels changing means 1103 sets one vacant radio to a channel other than $ch_1$ on the other node, and changes the channel of the bottleneck link from $ch_1$ to the channel to which the vacant radio is set. Then, independent channels changing means 1103 sends the changed channel setting to the channel utility calculating means 1102 and continual optimizing deciding means 1105.

The dependent channels changing means 1104 is used to change the channel setting when change of channel of the bottleneck will affect other channels. In addition, the dependent channels changing means 1104 will send an instruction instructing not to resume selection to the bottleneck links selecting means 1102 when no further optimization is needed.

If two nodes of the bottleneck link do not have another common channel besides channel ch1 and nodes of the bottleneck link do not have a vacant radio, or if two nodes of the bottleneck link do not have another common channel besides channel ch1, but at least one node of the bottleneck link has a vacant radio while the other node of the bottleneck link does not have a channel other than the channel ch1, the dependent channels changing means 1104 calculates, for each channel available in the work, total amount of interference that the bottleneck link will face.

If the channel with the least total amount of interference, which is denoted as ch2, is the channel ch1, the dependent channels changing means 1104 instructs the bottleneck links selecting means 1102 not to continue to select. In such case, no further optimization is needed.

If the channel ch2 is not the channel ch1, the subsequent links selecting sub-means 1004 changes the channel of the bottleneck link from channel ch1 to ch2 by changing channel on which radios on two nodes of the bottleneck link are working from ch1 to ch2, and then changes in turn channel of other links that needs to be changed due to the change of channels of the radios. Then, the subsequent links selecting sub-means 1004 sends the changed channel setting to the channel utility calculating means 1102 and the continual optimizing deciding means 1105.

The continual optimizing deciding means 1105 receives the channel utility calculated by the channel utility calculating means 1101. If the maximum value new_MU of current channel utilities that are calculated by the channel utility calculating means 1101 for current channel setting wherein some channels are changed by the independent channels changing means 1103 or the dependent channels changing means 1104 is larger than the maximum value Init_MU of channel utilities last calculated, the continual optimizing deciding means 1105 restores to the channel setting before the current channel setting, and instructs the bottleneck links selecting means 1102 not to continue to select. In such case, the maximum value of channel utility of the changed channel setting is larger than the previous channel utility. This does not conform to the purpose of the invention, that is, to reduce the channel utility.

The foregoing portion describes the method and device for embodying the present invention. The solution of the present invention belongs to static channel assigning solution. This solution determines the channel setting of radios in an interval of, for example, several hours. This solution supposes that topology of the network is stable and traffic loads on links might be unbalanced, which is exactly the case of wireless mesh network. On such supposition, the solution assigns different weights to different links. The weights are then used as inputs for assigning channels so as to make the link with larger weight to face less interference.

The weight of a link is determined based on relation between historical traffic loads on the link and others. If historical data shows that one link usually has larger load than average load, the link is assigned a weight that is larger than 1. On the other hand, if one link usually has smaller load than average load, the link is assigned a weight that is smaller than 1. If the historical data shows that load of a link has no obvious pattern in comparison with the average load, the link is assigned a weight of 1. This means that this link is treated as an average link in the channel assignment.

In order to determine the channel setting for all radios in the network, the solution of the present invention treats the channel assignment problem as a graph decomposition problem, wherein topology of the network is decomposed into various sub-graphs each operating on a different channel. The topology is decomposed in accordance with the carefully designed rules, such that a link with weight larger than 1 faces interference smaller than average while a link with weight smaller than 1 faces interference larger than average. In this manner, traffic load and capacity of each link can be matched so as to improve capacity of the network.

Although the present invention has been described with respect to specific embodiments thereof, various changes and modifications may be suggested to one skilled in the art. It is intended such changes and modifications fall within the scope of the appended claims.

What is claimed is:

1. A method of assigning channels to links in a wireless mesh network, the network comprising a first mesh router and a second mesh router, the first mesh router having a first radio component and the second mesh router having a second radio component, wherein the first mesh router and the second mesh router are within transmission ranges of the first radio component and the second radio component, the first radio component having a first unidirectional link and a second unidirectional link between the first mesh router and the second mesh router, directions of the first unidirectional link and the second unidirectional link are opposite to each other, the method comprising:

measuring a first average busy time of the first unidirectional link and a second average busy time of the second unidirectional link, wherein the first average busy time is a period of time in which the first unidirectional link transmits traffic over a given period and the second average busy time is a period of time in which the second unidirectional link transmits traffic over the given period; and assigning, by a processor, a first channel to the first unidirectional link based on the first average busy time and a second channel to the second unidirectional link based on the second average busy time, wherein the method is performed periodically in at an interval of two successive channel assignments, wherein the step for assigning a channel to each link based on the link load of each of the links includes following steps:

dividing the link load of each of the links by an average of link loads of all links in the wireless mesh network to determine a relative link load of each link, in the period;

for each of the links, deciding whether the link has existed in the last t periods, wherein the t is an integer that is larger than 0, if the link has not existed in the last t periods, setting a weight of the link to be I, and if the link has existed in the last t periods, calculating the weight of the link based on relative link loads of the link in the last t periods; and assigning a channel to each link based on the link weight of each of the links, and wherein the step for calculating link weight of the link includes following steps:

for each link L, if $\mu(L)-h\times\sigma(L)>1$ or $\mu(L)+h\times\sigma(L)<1$, setting the link weight of link L to be $\mu(L)$, if $\mu(L)-h\times\sigma(L)\leqq 1$ and $\mu(L)+h\times\sigma(L)\geqq 1$, setting the link weight of link L to be 1, wherein, μ(L) and σ(L) are a mean value and a standard error of relative loads on link L in the last t periods, respectively, and h is an integer that is larger than 0 or equal to 0.

2. The method of claim 1, wherein the step for assigning a channel to each link based on the link weight of the link includes following steps performed repeatedly:
S1: deciding whether there is a node, to which links unassigned with channels in this channel assignment, are attached, if No, this channel assignment ends, if Yes, going to step S2;
S2: selecting, from those nodes which links unassigned with channels in this channel assignment are attached to, one node as a starting node;
S3: selecting, from links attached to the starting node that are unassigned with channels in this channel assignment, the link that has maximum link weight as a first link;
S4: deciding whether there is a channel that is not assigned in this channel assignment, if Yes, going to step S5, if No, going to step S6;
S5: randomly determining one channel that is not assigned in this channel assignment, then going to step S8;
S6: calculating, for each channel available in the wireless mesh network, a total amount of interference that the first link will face if the channel is assigned to each channel;
S7: determining the channel with the least total amount of interference to the first link;
S8: breadth-first traversing a topology of the network from the starting node to select links, wherein nodes of the topology are the mesh routers, and edges of the topology are the links; and
S9: assigning the determined channel which selected in step S5 or S7 to the first link and those links selected in the traversing of step S8.

3. The method of claim 2, wherein the step for selecting the starting node includes following steps:
for each node, summing the link weights of all links attached to the node to obtain a node weight of the node; and
deciding whether there are a plurality of nodes with a same maximum node weight,
if Yes, selecting the node with a number of least vacant radios as the starting node,
if No, selecting the node with a greater node weight as the starting node.

4. The method of claim 2, wherein the step for traversing topology of the network from the starting node in a breadth-first traversing way to select links includes following steps:
queuing the starting node into a FIFO queue;
queuing the other node of the first link into the FIFO queue; and
repeating following steps until the queue is empty:
S1: de-queuing a first of the nodes in the queue;
S2: deciding whether the de-queued node has links that are unassigned with channels and unselected in this channel assignment, if No, returning to step S1, if Yes, going to step S3;
S3: deciding whether the de-queued node has a plurality of vacant radios, if No, going to step S4, if Yes, going to step S5;
S4: selecting all of links attached to the de-queued node that are unassigned with channels and unselected in this channel assignment, then going to step S7;
S5: selecting, from links attached to the de-queued node that are unassigned with channels and unselected in this channel assignment, some links in order to fairly distribute link weights of those unassigned with channels to the plurality of vacant radios;
S6: deciding whether a link is selected in step S5, if No, returning to step S1, if Yes, going to step S7; and
S7: queuing other nodes of the selected links into the FIFO queue, then returning to step S1.

5. The method of claim 4, wherein the step for selecting, from links attached to the de-queued node that are unassigned with channels and unselected in this channel assignment, some links includes following steps:
calculating a sum of the link weights of all of links attached to the de-queued node that are unassigned with channels;
dividing the sum of the link weights by a number of the vacant radios so as to obtain fair share of a vacant radio of the de-queued node;
deciding whether the sum of link weights of the selected links attached to the de-queued node is less than the fair share; and
if Yes, in descending order of the link weights, selecting links from those attached to the de-queued node that are unassigned with channels and unselected in this channel assignment, such that sum of the link weights of those selected before and selected currently becomes maximum while not larger than the fair share, and
if No, selecting no link.

6. The method of any of claims 1 and 2-5, further including a step, performed after the step for assigning channel to each link, for changing channels of bottleneck links in the network to further reduce interference that those links face.

7. The method of claim 6, wherein the step for changing channels of bottleneck links includes following steps:
S1: calculating channel utility of each link in channel setting of the network;
S2: selecting a link with the maximum channel utility as a bottleneck link, wherein the channel on which the bottleneck link is working is denoted as $ch_1$, and the maximum channel utility is denoted as Init_MU;
S3: deciding whether two nodes of the bottleneck link have another common channel besides channel $ch_1$, if Yes, going to step S3a, if No, going to step S4;
S4: deciding whether nodes of the bottleneck link have a vacant radio, if Yes, going to step S5, if No, going to step S7;
S5: selecting one node of the bottleneck link having a vacant radio;
S6: deciding whether the other node of the bottleneck link has a channel other than the channel $ch_1$, if Yes, going to step S6a, if No, going to step S7;
S7: calculating, for each channel available in the wireless mesh network, a total amount of interference that the bottleneck link will face;
S8: deciding whether a channel $ch_2$ with the least total amount of interference is the channel $ch_1$, if Yes, going to step S14, if No, going to step S9;
S9: changing a channel on which radios on two nodes of the bottleneck link are working from $ch_1$ to $ch_2$ so as to change the channel of the bottleneck link from channel $ch_1$ to $ch_2$;
S10: changing a channel of other links that needs to be changed due to the change of channel of the radios in step S9 from $ch_1$ to $ch_2$;
S11: calculating new channel utility of each link in the new channel setting;

S12: deciding whether New_MU, which denotes the maximum of the new link utilities, is larger than the Init_MU, if Yes, returning to step S2, if No, going to step S13;

S13: restoring to the channel setting before the new channel setting;

S14: the process of changing channels of bottleneck links ends;

S3a: changing the channel of the bottleneck link from the channel ch 1 to another common channel, then going to step S11;

S6a: setting one vacant radio to a channel other than $ch_1$ on the other node; and S6b: changing the channel of the bottleneck link from $ch_1$ to the channel to which the vacant radio is set, then going to step S11.

8. The method of claim 7, wherein the channel utility of a link $L_1$, is calculated in accordance with follow equation:

$$util(L_i) = \sum_{j=1}^{m} intf(L_j, L_i) \times weight(L_j),$$

wherein, m denotes total number of links in the network, $intf(L_j, L_i)$ denotes the probability that $L_i$, cannot work when link $L_j$ is working, $weight(L_j)$ denotes link weight of link $L_j$.

9. The method of claim 8, wherein the total amount of interference that a link $L_i$, will face is calculated in accordance with following expression:

$$\sum_{L_j \in LS(ch)} intf(L_j, L_i) \times weight(L_j)$$

wherein, LS(ch) denotes the set of links in the network that have been assigned with channel ch, $intf(L_j, L_i)$ denotes the probability that $L_i$, cannot work when link $L_j$ is working, $weight(L_j)$ denotes link weight of link $L_j$.

10. The method of claim 1, wherein the period is a period of at least an hour or a day.

11. The method of claim 10, wherein different periods are unequal.

12. A device that assigns channels to links in a wireless mesh network, the network comprising a first mesh router and a second mesh router, the first mesh router having a first radio component and the second mesh router having a second radio component, wherein the first mesh router and the second mesh router are within transmission ranges of the first radio component and the second radio component, the first radio component having a first unidirectional link and a second unidirectional link between the first mesh router and the second mesh router, directions of the first unidirectional link and the second unidirectional link are opposite to each other, the device comprising:

a link load measuring means that measures a first average busy time of the first unidirectional link and a second average busy time of the second unidirectional link, wherein the first average busy time is a period of time in which the first unidirectional link transmits traffic over a given period and the second average busy time is a period of time in which the second unidirectional link transmits traffic over the given period; and a channel assigning means that assigns a first channel to the first unidirectional link based on the first average busy time and a second channel to the second unidirectional link based on the second average busy time, wherein the channel assigning means comprises:

a relative link load determining means that divides the link load from the link load measuring means by an average of link loads of all links in a period so as to determine a relative link load of each link for the period, and wherein the period is a time interval of successive channel assignments;

a link weight determining means that determines, for each link, whether the link has existed in the last t periods, wherein the t is an integer that is larger than 0, for determining a link weight of the link to be 1 if the link has existed in the last t periods, and for determining the link weight of the link based on relative link loads of the link in the last t periods from the relative link load determining means if the link has not existed in the last t periods; and a channel assigning sub-means for assigning a channel to each link based on the link weight of the link from the link weight determining means, and wherein the link weight determining means comprises:

a first deciding means that determines, for each link L, the relation between $\mu(L)-h \times \sigma(L)$ or $\mu(L)+h \times \sigma(L)$ and 1, wherein, $\mu(L)$ and $\sigma(L)$ are a mean value and standard error of relative loads on link L in the last t periods, respectively, and h is an integer that is larger than 0 or equal to 0; and a first determining means that determines the link weight of the link L to be 1 or $\mu(L)$ according to the deciding result of the first deciding means, which determines the link weight of the link L to be $\mu(L)$ if the deciding result indicates $\mu(L)-h \times \sigma(L) >1$ or $\mu(L)+h \times \sigma(L)<1$, and determines the link weight of link L to be 1 if the deciding result indicates $\mu(L)-h \times \sigma(L) \leq 1$ and $\mu(L)+h \times \sigma(L) \geq 1$.

13. The device of claim 12, wherein the channel assigning sub-means comprises a link selecting means, a channel determining means and a assigning means, and the link selecting means selects one node from the mesh routers as a starting node and a link that has maximum link weight from links attached to the starting node that are unassigned with channels as a first link based on the link weights determined by the link weight determining means, sends information on the first link to the channel determining means, selects subsequent links by breadth-first traversing a topology of the network from the starting node and sends information on the first link and the subsequent links to the assigning means until there exist no links that are unassigned with channels among those that attach to the mesh routers in the network, wherein nodes of the topology are the mesh routers, and edges of the topology are the links;

the channel determining means determines whether there is a channel that is not assigned, if Yes, randomly determines a channel that is not assigned, and if No, calculates, for each channel available in the work, a total amount of interference that the first link will face if the channel is assigned to each channel and determining the channel with a least total amount of interference; and the assigning means assigns the channel determined by the channel determining means to the first link and the subsequent link selected by the link selecting means.

14. The device of claim 13, wherein the link selecting means comprises:
  a starting node selecting means that selects one node from the mesh routers as the starting node based on the link weights;
  a first link selecting means that selects the link that has a maximum link weight from links attached to the starting node that are unassigned with channels as the first link and sends the information on the first link to the channel determining means; and
  a subsequent links selecting means that selects the subsequent links by breadth-first traversing the topology of the network from the starting and sends the information on the subsequent links to the assigning means.

15. The device of claim 14, wherein the starting node selecting means comprises:
  a node weight calculating means that sums, for each node, the link weights, which are determined by the link weight determining means, of all links attached to the node to calculate a node weight of the node; and
  a starting node selecting sub-means, according to the node weight of each node that calculated by the node weight calculating means, that determines whether there exists a plurality of nodes with a same maximum node weight, selects the node with a number of least vacant radios from the plurality of nodes with the same maximum node weight as the starting node if Yes and selects the node with the maximum node weight as the starting node if No.

16. The device of claim 14, wherein the subsequent links selecting means comprises a queue manipulating means and a subsequent links selecting sub-means, and wherein
  the queue manipulating means queues the starting node selected by the starting node selecting means and the other node of the first link selected by the first link selecting means into a FIFO queue in order, and dequeues the a first of the nodes in the queue, queues nodes into the FIFO queue when information on the nodes is received from the subsequent links selecting sub-means, dequeues first of nodes in the queue when a de-queuing instruction is received from the subsequent links selecting sub-means until there is no node in the queue, and sends information on the de-queued node to the subsequent links selecting sub-means; and
  the subsequent links selecting sub-means sends a de-queuing instruction to the queue manipulating means when there is no a link that is unassigned with a channel and unselected among links attached to the node de-queued from the queue manipulating means, selects, from links attached to the de-queued node that are unassigned with channels and unselected, some links in order to fairly distribute link weights of those unassigned with channels to the plurality of vacant radios when there is a link that is unassigned with a channel and unselected among links attached to the node de-queued from the queue manipulating means and the de-queued node has a plurality of vacant radios, determines whether a link is selected, sends information on the other node of the link to the queue manipulating means and sends a de-queuing instruction to the queue manipulating means if Yes, and sends only a de-queuing instruction to the queue manipulating means if No, and selects all of links attached to the de-queued node that are unassigned with channels and unselected when there is a link that is unassigned with a channel and unselected among links attached to the node de-queued from the queue manipulating means but the de-queued node does not have a plurality of vacant radios, sends information on other nodes of the selected links to the queue manipulating means and sends a de-queuing instruction to the queue manipulating means.

17. The device of claim 16, wherein the subsequent links selecting means comprises:
  a fair share calculating means that calculates sum of the link weights of all of links attached to the de-queued node that are unassigned with channels, and divides a sum of the link weights by a number of vacant radios of the de-queued node so as to obtain a fair share of one of the vacant radios;
  a selected link weight summing means that calculates a sum of link weights of the selected links attached to the de-queued node; and
  a first subsequent links selecting sub-means that determines whether the sum of link weights calculated by the selected link weight summing means is less than the fair share calculated by the fair share calculating means, and, in descending order of the link weights, selects links from those attached to the de-queued node that are unassigned with channels and unselected in this channel assignment, such that sum of the link weights of those selected before and selected currently becomes maximum while not larger than the fair share if Yes, but selecting no link if No.

18. The device of any of claims 12 and 13-17, further comprising an iteration optimizing means that changes channels of bottleneck links in the network that the channel assigning means has assigned to further reduce interference that those links face.

19. The device of claim 18, wherein the iteration optimizing means comprises a channel utility calculating means, a bottleneck links selecting means, an independent channels changing means, a dependent channels changing means and a continual optimizing deciding means, wherein
  the channel utility calculating means calculates channel utility of each link in channel setting of the network from the channel assigning means, the independent channels changing means or the dependent channels changing means,
  the bottleneck links selecting means selects the link with the maximum channel utility as a bottleneck link according to the channel utilities calculated by the channel utility calculating means until an instruction indicating not to continue to select is received from the dependent channels changing means or the continual optimizing means, wherein the channel on which the bottleneck link is working is denoted as $ch_1$, and the maximum channel utility is denoted as Init_MU;
  the independent channels changing means,
  if two nodes of the bottleneck link have another common channel besides channel $ch_1$, changes the channel of the bottleneck link from the channel $ch_1$ to the another common channel,
  if two nodes of the bottleneck link do not have another common channel besides channel $ch_1$, but at least one node of the bottleneck link has a vacant radio and the other node of the bottleneck link has a channel other than the channel $ch_1$, sets one vacant radio to a channel other than $ch_1$ on the other node and changing the channel of the bottleneck link from $ch_1$ to the channel to which the vacant radio is set, and sends the changed channel setting to the channel utility calculating means,
  the dependent channel changing means,
  if two nodes of the bottleneck link do not have another common channel besides channel $ch_1$ and nodes of the bottleneck link do not have a vacant radio, or if two nodes of the bottleneck link do not have another common channel besides channel $ch_1$, but at least one node of the bottleneck link has a vacant radio while the other node of the bottleneck link does not have a channel other than the channel $ch_1$, calculates, for each channel available in the wireless mesh network, a total amount of interference that the bottleneck link will face, if a channel $ch_2$ with the least total amount of interference is the channel $ch_1$, instructs the bottleneck links selecting means not to continue to select, if the channel $ch_2$ is not the channel $ch_1$, changes the channel of the bottleneck link from channel $ch_1$ to $ch_2$ by changing channel on which radios on two nodes of the bottleneck link are working from $ch_1$ to $ch_2$, and then changing in turn channel of other links that needs to be changed due to the change of channels of the radios, and sends the changed channel setting to the channel utility calculating means; and the continual optimizing deciding means is used for restoring to the channel setting before the current channel setting and instructing the bottleneck links selecting means not to continue to select if the maximum value new_MU of current channel utilities that are calculated by the channel utility calculating means for current channel setting wherein some channels are changed by the independent channels changing means or the dependent channels changing means is larger than the maximum value Init_MU of channel utilities last calculated.

* * * * *

UNITED STATES PATENT AND TRADEMARK OFFICE
CERTIFICATE OF CORRECTION

| | |
|---|---|
| PATENT NO. | : 8,077,666 B2 |
| APPLICATION NO. | : 12/163544 |
| DATED | : December 13, 2011 |
| INVENTOR(S) | : Jinling Wang and Yong Xia |

It is certified that error appears in the above-identified patent and that said Letters Patent is hereby corrected as shown below:

In the Specification

Column 14, Line 16: After "Shown in" delete "to".

In the Claims

Column 16, Line 57: In Claim 1, delete "be I," and insert -- be 1, --

Column 19, Line 9: In Claim 7, delete "ch 1" and insert -- $ch_1$ --

Column 19, Line 17: In Claim 8, delete "$L_i$," and insert -- $L_i$ --

Column 19, Line 40: In Claim 9, delete "$L_i$," and insert -- $L_i$ --

Signed and Sealed this
Twenty-third Day of September, 2014

Michelle K. Lee
*Deputy Director of the United States Patent and Trademark Office*